(12) United States Patent  
Kaneda et al.

(10) Patent No.: US 8,095,019 B2
(45) Date of Patent: Jan. 10, 2012

(54) DIGITAL CLOCK AND DATA RECOVERY SCHEME

(75) Inventors: Noriaki Kaneda, Westfield, NJ (US); Andreas Bertold Leven, Heroldsberg (DE)

(73) Assignee: Alcatel Lucent, Paris (FR)

( * ) Notice: Subject to any disclaimer, the term of this patent is extended or adjusted under 35 U.S.C. 154(b) by 669 days.

(21) Appl. No.: 12/182,221

(22) Filed: Jul. 30, 2008

(65) Prior Publication Data

US 2010/0028011 A1     Feb. 4, 2010

(51) Int. Cl.
*H04B 10/06* (2006.01)

(52) U.S. Cl. ........ 398/208; 398/183; 398/115; 375/316; 375/343; 375/350

(58) Field of Classification Search .................. 398/183, 398/192, 193, 208, 186, 115; 375/350, 343, 375/326, 325, 349, 348, 346, 316
See application file for complete search history.

(56) References Cited

U.S. PATENT DOCUMENTS

| 6,668,014 | B1 | 12/2003 | Endres et al. | |
| 7,609,979 | B2* | 10/2009 | Taylor | 398/208 |
| 7,747,169 | B2* | 6/2010 | Koc | 398/65 |
| 2006/0013597 | A1* | 1/2006 | Crivelli et al. | 398/208 |
| 2007/0297806 | A1 | 12/2007 | Kaneda et al. | |
| 2008/0152361 | A1 | 6/2008 | Chen et al. | |
| 2008/0152363 | A1* | 6/2008 | Koc | 398/208 |

* cited by examiner

*Primary Examiner* — M. R. Sedighian
(74) *Attorney, Agent, or Firm* — Wall & Tong, LLP (57) ABSTRACT

A method and apparatus providing clock and data recovery within an optical receiver using three CMA FIR filters with different group delays where filter coefficients are adapted to provide for a filter exhibiting a group delay of one sample period from which symbols for further processing are provided.

17 Claims, 7 Drawing Sheets

DIGITAL CLOCK AND DATA RECOVERY SCHEME

FIELD OF THE INVENTION

The invention relates to optical receivers and, more particularly, to clock and data recovery within an optical receiver.

BACKGROUND

Clock and data recovery (CDR) in digital signal processing (DSP) based optical receivers is challenging if the received signal is distorted by chromatic dispersion, polarization mode dispersion or non-linear effects. Traditional digital clock recovery schemes are too complex to be implemented at data rates typically used in optical communications.

Clock and data recovery in digital signal processing (DSP) based optical receivers can be performed either in analog domain, digital domain, or in a mixed-mode fashion.

In an analog clock and data recovery scheme, the unprocessed signal before digitization is used for extracting a clock signal. This imposes limits on the maximum signal distortion (chromatic dispersion, polarization-mode dispersion, non-linearity) a receiver can handle independently of post-compensation.

In a digital clock and data recovery scheme, the digitized signal is processed by (1) extracting the actual clock signal, and (2) re-processing the sampled data so that it reflects the timing estimate extracted in the clock recovery scheme. Clock signal extraction in the digital domain is typically based on FFT-based tone extraction, while data recovery is typically performed using an interpolation filter with adjustable coefficients or a using a bank of interpolation filters with fixed coefficients. The adjustment of the coefficients in the first case or the selection of the output filter in the second case is based on the phase of the recovered clock.

In a mixed-mode clock and data recovery scheme, a control signal is fed back to an oscillator that creates a clock signal for an analog-to digital conversion based on the digitally recovered clock.

BRIEF SUMMARY

Various deficiencies of the prior art are addressed by the present invention of an apparatus, method and system for processing a sequence of complex sampled values associated with a modulated optical carrier. According to various embodiments, clock and data recovery within an optical receiver is provided using three CMA FIR filters with different group delays, where filter coefficients are adapted to provide a middle group delay filter from which symbols for further processing are provided.

In one embodiment, an apparatus comprises a digital signal processor (DSP) adapted to receive a sequence of complex sampled values associated with a modulated optical carrier and responsively provide a corresponding sequence of symbols; the DSP is configured to include three constant modulus algorithm (CMA) adaptive finite impulse response (FIR) filters, each filter processing the received sequence of complex sampled values according to a respective set of filter coefficients to provide thereby a respective sequence of symbols, a first filter exhibiting a first group delay, a second filter exhibiting a second group delay and a third filter exhibiting a third group delay, the first group delay initially being less than the second group delay, the second group delay initially being less than the third group delay; the DSP is configured to include a mechanism for adapting the filter coefficients sets to constrain the exhibited group delays; the DSP selecting for further processing the sequence of symbols provided by the second filter.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

Figure 1:
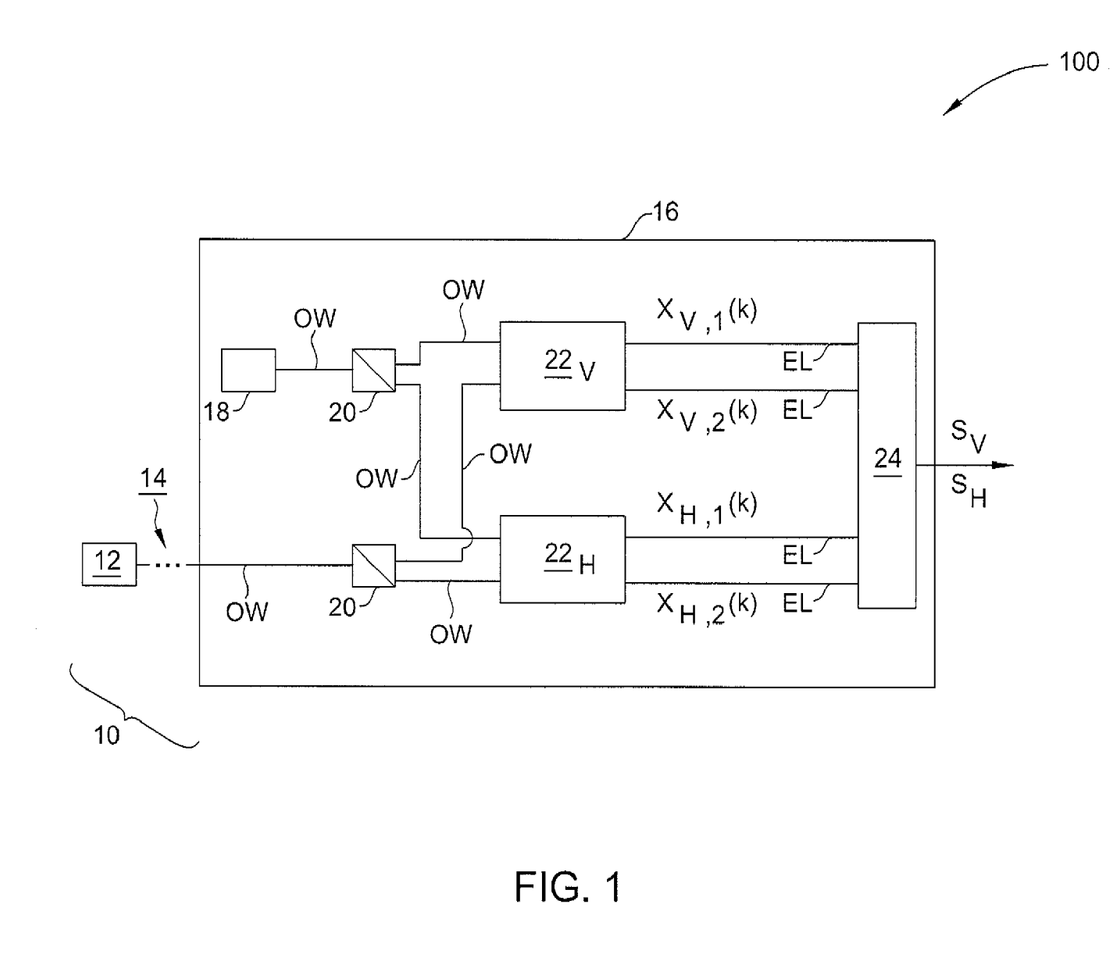
FIG. 1 depicts a high level block diagram of a polarization-sensitive optical receiver.

The invention will be primarily described within the context of digital signal processor (DSP) implementing a clock and data recovery (CDR) function within an optical receiver. However, those skilled in the art and informed by the teachings herein will realize that the invention is also applicable to various other CDR embodiments. Moreover, the various embodiments are primarily presented within the context of a phase modulated optical carrier signal. It will be appreciated by those skilled in the art that the invention may also be utilized within the context of phase and amplitude modulated signals such as quadrature amplitude modulation (QAM) optical carrier signals. In these embodiments, minor modifications for frequency and phase estimation are provided FIG. 1 depicts a high level block diagram of a polarization-sensitive optical receiver. Specifically, the optical receiver 16 receives a PSK or QAM modulated optical carrier from an optical transmitter 12 via an optical communications channel 14, illustratively a fiber or free-space optical channel. The optical receiver 16 in some embodiments receives and demodulates data from an optical carrier that has polarization multiplexed data thereon, and in some embodiments may receives and demodulates data from an optical carrier in a polarization diverse manner.

The optical receiver 16 includes a local optical oscillator 18, polarization splitters 20, 2×2 hybrid optical detectors $22_V$, $22_H$, a digital signal processor (DSP) 24, and a plurality of optical waveguides (OWs) and electrical lines (ELs) that connect elements 18, 20, $22_V$, $22_H$, 24, and optical and electrical ports of the optical receiver 16. Herein, the letters and subscripts "V" and "H" will be used to indicate two non-parallel linear polarization components, e.g., the "vertical" and "horizontal" components in a laboratory frame.

The local optical oscillator 18 produces a continuous-wave (CW) reference optical carrier at about the wavelength of the modulated optical carrier received from the optical communications channel 14. The local optical oscillator 18 comprises, illustratively, a stabilized diode laser. For example, the laser may include a conventional wavelength locker that keeps its frequency within a preselected maximum offset from the frequency of the modulated optical carrier transmitted by the optical transmitter 12. A first optical splitter 20 passes portions of the modulated optical carrier to each of the hybrid optical detectors $22_V$, $22_H$. A second optical splitter 20 passes portions of the optical signal produced by the local optical oscillator 18 to each of the hybrid optical detectors $22_V$, $22_H$. The local optical oscillator 18 frequency downmixes the received optical carrier in the hybrid optical detectors $22_V$, $22_H$. Thus, the local optical oscillator 18 is configured to produce the reference optical carrier with a frequency $\omega_{RC}$ that is approximately equal to the frequency $\omega_{MC}$ of the data-carrying modulated optical carrier, which is transmitted by the optical transmitter 12. The optical receiver 16 does not, however, have a feedback loop for phase or frequency locking the local optical oscillator 18 to the modulated optical carrier.

The hybrid optical detectors $22_V$, $22_H$ receive and coherently mix the modulated optical carrier from the optical communications channel 14 with the CW reference optical carrier from the local optical oscillator 18. By such mixing, each hybrid optical detector $22_V$, $22_H$ produces a first stream of complex digital sampled values $X_{V(k)s}$, and a second stream of complex digital sampled values $X_{H(k)s}$. Here, $X_{V(k)} = [X_{V,1(k)} + iX_{V,2(k)}]$ and $X_{H(k)} = [X_{H,1(k)} + iX_{H,2(k)}]$. The $X_{V(k)s}$ and $X_{H(k)s}$ are complex digital sampled values indicative in amplitude and phase of the respective "V" and "H" linear polarization components of the modulated optical carriers as frequency down-mixed by the reference optical carrier.

The DSP 24 constructs one or two output streams of estimated demodulated PSK symbols, illustratively a stream $S_{Vs}$ and a stream $S_{Hs}$ from the corresponding one or two streams of complex digital sampled values that are received from the hybrid optical detectors $22_V$, $22_H$ (i.e., the streams $X_{V(k)s}$ and $X_{H(k)s}$). The DSP 24 may perform various types of digital processing on the complex digital sampled values received from the hybrid optical detectors $22_V$, $22_H$ to improve estimations of the demodulation of data there from. The digital processing may correct or compensate for signal degradations produced by optical transmission and detection, such as due to a frequency offset, polarization transformation, polarization mode dispersion, chromatic dispersion, and noise.

Figure 2:
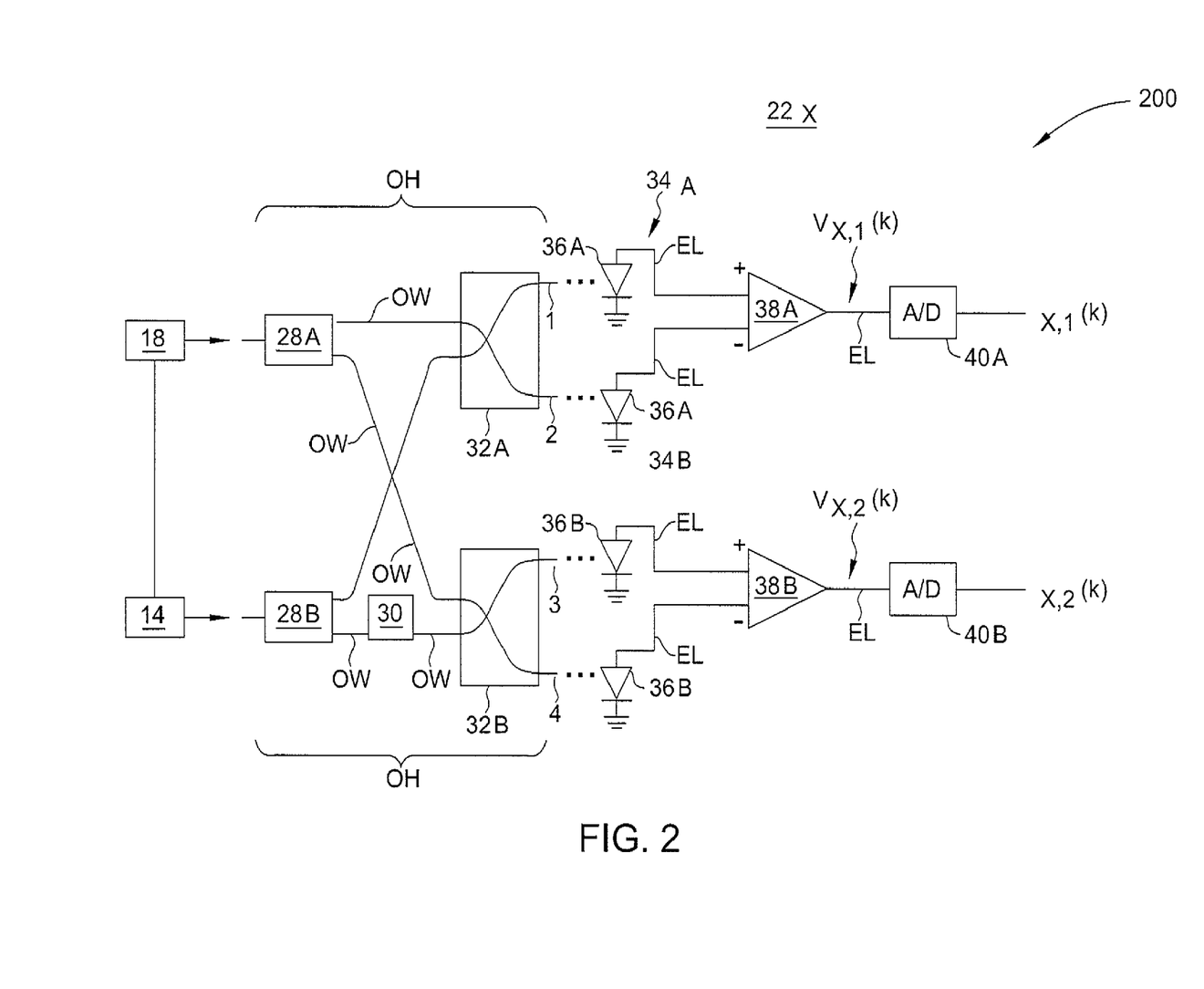
FIG. 2 depicts a high level block diagram of a hybrid optical detector suitable for use in the polarization-sensitive optical receiver of FIG. 1.

FIG. 2 depicts a high level block diagram of a hybrid optical detector suitable for use in the receiver of FIG. 1. Specifically, FIG. 2 shows a structure $22_X$ suitable for use as the hybrid optical detectors $22_V$, $22_H$ of the receiver 10 of FIG. 1. The subscript "X" as used herein refers to linear polarization index "V" and/or "H" as appropriate.

The hybrid optical detector $22_X$ includes an optical hybrid (OH) section and first and second optical detector sections that measure light intensities output by the optical hybrid via digital sampling.

The optical hybrid section OH includes two 1×2 optical intensity splitters 28A, 28B, an optical phase delay 30, and two 2×2 optical couplers 32A, 32B as well as optical waveguides OW connected to various ones of these elements. The optical hybrid section produces, at two pairs of optical outputs (i.e., pair (1,2) and pair (3,4)), respective signals comprising interfered mixtures of the modulated and reference optical carriers. The relative intensities of the mixtures at the two outputs of each pair are sensitive to relative phases of the interfered light. The relative phases of the interfered mixtures at the first pair of optical outputs are different than at the second pair of optical outputs.

Each optical detector includes one pair 34A, 34B of photodiodes 36A, 36B, a differential amplifier 38A, 38B, and analog-to-digital converters 40A, 40B as well as electrical lines EL interconnecting various ones of these elements. Each optical detector measures the optical signals at one pair of the optical outputs of the optical hybrid OH section (i.e., the pair (1,2) or the pair (3,4)). Each optical detector produces a sequence of digital electrical values by sampling the intensities of the interfered carriers at one pair of the optical outputs of the optical hybrid.

Each 1×2 optical intensity splitter 28A, 28B power splits received light so that about 50 percent of the light is directed to each of its optical outputs. One of the 1×2 optical intensity splitters 28A is connected to receive light from the local optical oscillator 18. The other of the 1×2 optical intensity splitters 28B is connected to receive light of the modulated optical carrier from the optical communications line 14. Each of the 1×2 optical intensity splitters 28A, 28B is connected to deliver light to an optical input of the 2×2 optical coupler 32A and to an optical input of the other 2×2 optical coupler 32B.

The optical phase delay 30 and connected optical waveguides OW introduce a relative phase delay Δ between the light transmitted from the 1×2 optical splitter 28B to the 2×2 optical coupler 32B and the light transmitted from the 1×2 optical splitter 28B to the 2×2 optical coupler 32A. Typically, the relative phase delay Δ is between $\pi/3$ and $2\pi/3$ modulo $P\pi$. The relative phase delay Δ is preferably between $3\pi/8$ and $5\pi/8$ modulo $P\pi$ and is more preferably about $\pi/2$ modulo $P\pi$, where P is an integer. By contrast, the other optical waveguides OW do not introduce a substantial relative phase delay (e.g., modulo $P\pi$) between the light transmitted from the other optical intensity splitter 28A to the optical coupler 32A and the light transmitted from the other optical intensity splitter 28A to the optical coupler 32B.

Alternately, the optical phase delay 30 may be connected to one of the optical outputs of the 1×2 optical splitter 28A rather than to one of the optical outputs of the 1×2 optical splitter 28B (not shown). Then, the optical phase delay 30 would introduce a relative phase delay Δ between the light transmitted from the 1×2 optical splitter 28A to the 2×2 optical coupler 32A and the light transmitted from the 1×2 optical splitter 28A to the 2×2 optical coupler 32B. The relative phase delay Δ is between approximately $\pi/3$ and $2\pi/3$ modulo $P\pi$. In one embodiment the relative phase delay Δ is between approximately $3\pi/8$ and $5\pi/8$ modulo $P\pi$. In one embodiment the relative phase delay Δ is between approximately $7\pi/2$ modulo P. In this embodiment, the optical waveguides, OW, between the other optical intensity splitter 28B introduce substantially zero relative phase delay. That is, modulo $P\pi$ between the light transmitted from the 1×2 optical splitter 28B to the 2×2 optical coupler 32A and the light transmitted from the 1×2 optical splitter 28B to the 2×2 optical coupler 32B.

In the hybrid optical detector $22_X$, each of the 2×2 optical couplers 32A, 32B is connected to receive the same linear polarization component from the modulated optical carrier and the reference optical carrier. The optical couplers 32A, 32B mix (i.e., interfere) the light received at their optical inputs to produce preselected combinations of said light at their optical outputs. The optical couplers 32A, 32B may be implemented using, illustratively, conventional couplers or multi-mode interference (MMI) devices.

At each optical output of the 2×2 optical couplers 32A, 32B, a photo-diode 36A, 36B is positioned to detect the intensity of the outputted light. The photo-diodes form two matched pairs 34A, 34B, i.e., with a similar light-sensitivity and bandwidth. Each matched pair 34A, 34B of photo-diodes 36A, 36B transmits to the inputs of one of the differential amplifier 38A, 38B signals whose values are indicative of the detected output light intensities. Optionally, there might be an additional electrical amplifier in-between each photo-diode 36A, 36B and the inputs of the differential amplifier 38A. In an alternate embodiment, single ended photo detectors are used.

Each differential amplifier 38A, 38B outputs an analog voltage, i.e., $V_X,1$ or $V_X,2$, proportional to the signal difference between its two inputs. Here and below, the subscript "X" may refer to either the "H" linear polarization component or the "V" linear polarization component as appropriate.

From the analog voltages $V_X,1$ and $V_X,2$, the first and second A/D converters 40A, 40B produce respective first and second temporal sequences of digital sampled values (i.e., $X_X,1(k), X_X,1(k+1), \ldots$ and $X.sub.X,2(k), X_X,2(k+1), \ldots$). To produce these sequences, the A/D converters 40A, 40B sample the analog voltages $V_X,1$ and $V_X,2$ at sampling rate equal to or higher than of the modulation/symbol rate of the optical carrier output by the optical transmitter 12. In one embodiment, the A/D converters sample at approximately twice the symbol rate. The A/D converters 40A, 40B transmit the digital sampled values $X.sub.X,1(k)$ and $X_X,2(k)$ to the DSP 24 at sampling period "k". Here, the complex sampled value $X_X(k)$ satisfies: $X_X(k)=X_X,1(k)+iX_X,2(k)$.

Each complex digital sampled value $X_X(k)$ output by one of the hybrid optical detectors $22_X$ can be modeled as having the form:

$$X_X(k)=[B_X(k)+N_X(k)]\exp[i\phi_X(k)]. \qquad (eq. 1)$$

In the above equation, $B_X(k)$ and $\phi_X(k)$ are the amplitude and phase, and $N_X(k)$ is an amplitude noise at the sampling period "k". The phase $\phi(k)$ may be represented as $\phi_B(k)+\phi_S(k)+kT_S(\omega_{MC}-\omega_{RC})$ where $T_S$ is the sampling period, $\phi_B(k)$ is a phase angle for a PSK symbol, and $\phi_S(k)$ is an aggregate phase angle noise. The phase angles for PSK symbols have the form $N\pi/M$ where N is a positive integer and less than M. The positive integer M defines the PSK symbol constellation and may be 2, 3, 4, 5, . . . . For example, M=4 corresponds to the QPSK constellation, and M=8 corresponds to the 8PSK symbol constellation. The aggregate phase angle noise $\phi_S(k)$ may receive contributions from the line widths of the optical transmitter 12 and the local optical oscillator 18, as well as from optical amplifier noise.

Figure 3:
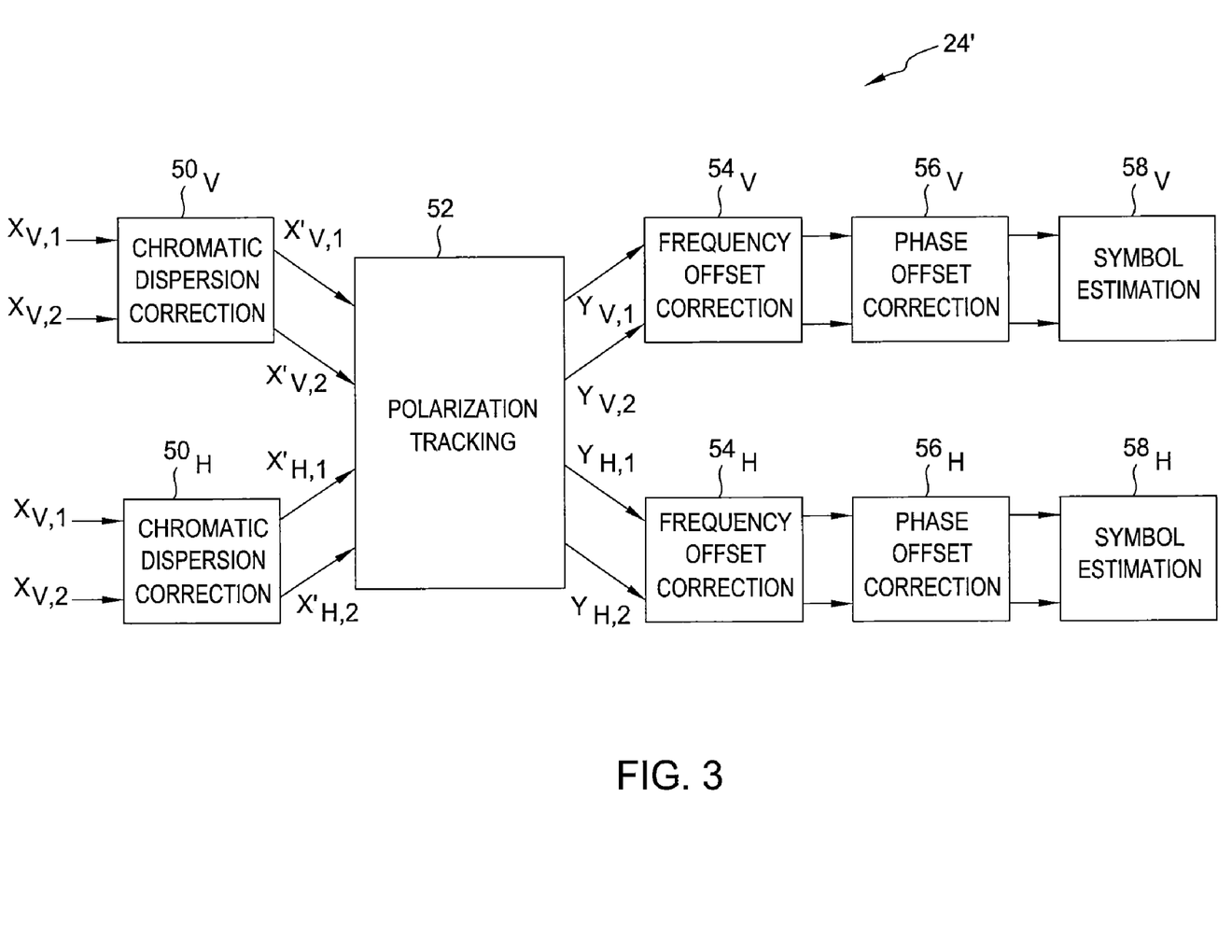
FIG. 3 depicts a high level block diagram of an exemplary digital signal processor (DSP) suitable for use in the polarization-sensitive optical receiver of FIG. 1.

FIG. 3 depicts a high level block diagram of an exemplary digital signal processor (DSP) suitable for use in the polarization-sensitive optical receiver of FIG. 1. The DSP 24' includes a series of structures that perform digital processing on the received $X_V(k)$s and $X_H(k)$s to enable performing better estimates of the values of the transmitted PSK symbol sequence. In the DSP 24", these structures include one or more phase offset correctors $56_V, 56_H$ and one or more symbol estimators $58_V, 58_H$. In some embodiments of the DSP 24", the structures may also include chromatic dispersion correctors $50_V, 50_H$; polarization trackers $52_V, 52_H$; and/or frequency offset correctors $54_V, 54_H$.

Below, exemplary digital processing structures are described for an embodiment of the DSP 24' as shown in FIG. 3.

Each chromatic dispersion corrector $50_X$ processes the sequence of complex digital sampled values $X_X(k)$'s received from the hybrid optical detector $22_X$ to produce a sequence of $X_X'(k)$'s (i.e., $X_X'(k)=X_X,1'(k)+X_X,2'(k)$). In the chromatic dispersion corrector $50_X$, the processing involves passing the received sequence of complex digital sampled values through a digital finite-impulse-response (FIR) filter. The FIR filter has weight coefficients selected to correct remaining inter-symbol interference caused by chromatic dispersion or other degrading effects in the optical communications channel 14. The weight coefficients may be static or may be adaptively updatable, e.g., via feedback to a weight update unit.

The polarization tracker 52 performs digital processing configured to correct and/or compensate polarization-dependent degradations of the modulated optical carrier that are caused in the optical communications channel 14. The polarization-dependent degradations or distortions may include, i.e. polarization rotations, polarization transformation, and combinations of both. The polarization tracker 52 includes three constant modulus algorithm (CMA) adaptive FIR filters, which will be described in more detail below with respect to FIG. 5.

The frequency offset correctors $54_X$ perform processing that corrects or compensates for a relative phase error of the complex digital signals output by the hybrid optical detectors 22X, wherein relative phase error is due to a frequency offset. In particular, the relative phase error to be corrected or compensated is due to the frequency offset between the local optical oscillator 18 and the modulated optical carrier received from the optical communications channel 14. This correction of an undesired effect due the frequency offset may be performed by passing the received complex digital data values (e.g., the $Y_X(k)$s) through an exemplary frequency offset corrector $54_X$, as described in more detail below with respect to FIG. 4.

The phase offset corrector $56_X$ performs digital processing that corrects or compensates for phase errors caused by not fully compensated frequency offset between local oscillator and received signal, phase noise of the local oscillator and/or transmit laser as well as noise accumulated during transmission e.g. from optical amplifiers. This correction may be produced by passing the frequency-offset-corrected phase arguments (i.e., the $\Theta_X(k)$s) which are output by the exemplary frequency offset corrector $54_X$, through phase offset corrector $56_X$, as described in more detail below with respect to FIG. 4.

Each symbol estimator $58_X$ performs one or more digital comparisons to estimate the symbol value $S_X(k)$ that corresponds to each final corrected argument values $\Theta_X(k)$. In particular, the symbol estimators $58_X$ perform one or more digital comparisons for each received $\Theta_X(k)$ to obtain an estimate of the symbol $S_X(k)$, such as in manner functionally similar to a slicer, as described in more detail below with respect to FIG. 4.

Figure 4:
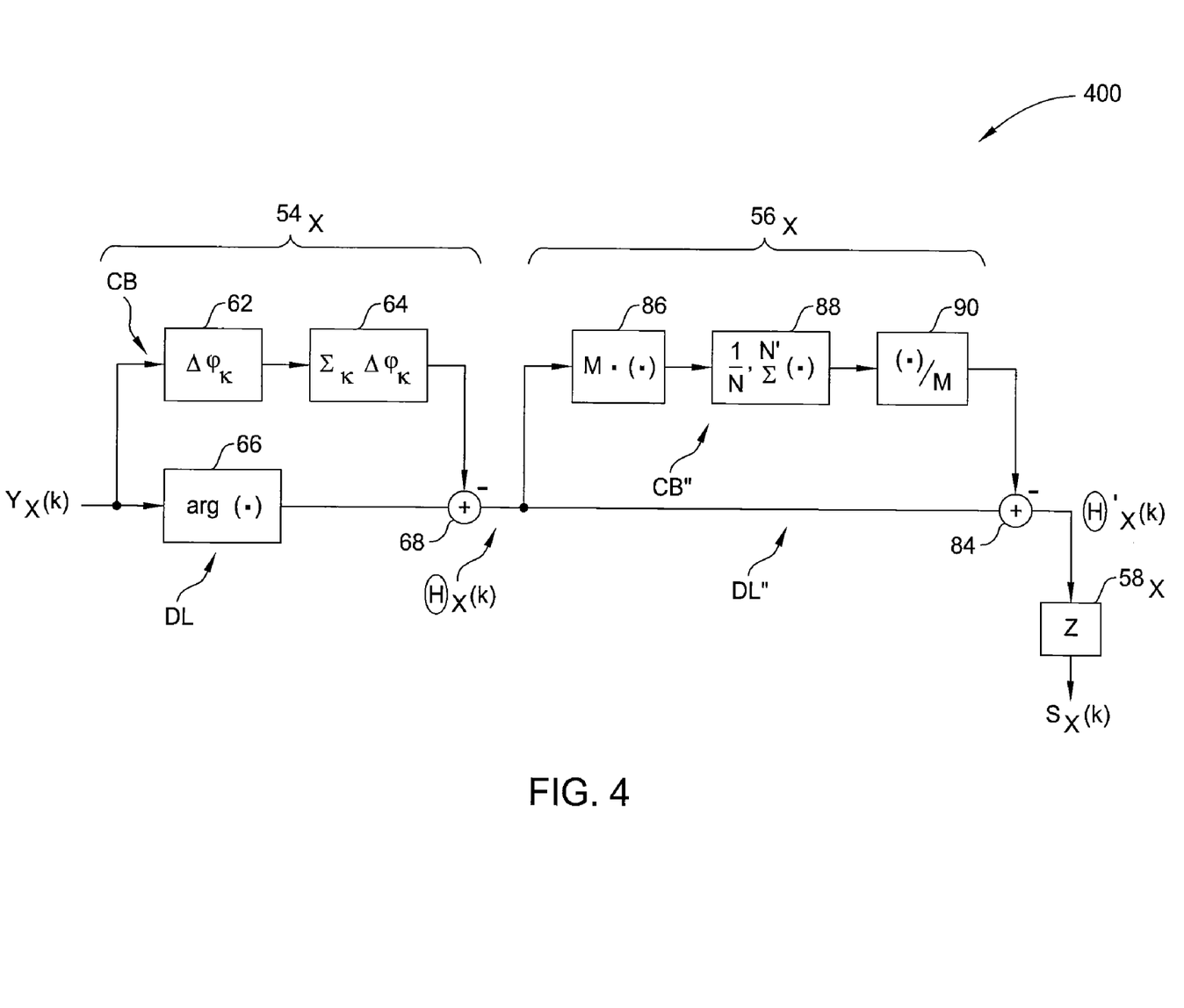
FIG. 4 depicts a high level block diagram of frequency offset and phase offset correctors suitable for use in the DSP of FIG. 3.

FIG. 4 depicts a high level block diagram of frequency offset and phase offset correctors suitable for use in the DSP of FIG. 3. Specifically, the frequency offset corrector $54'_X$ includes a correction branch CB which has a frequency offset estimator 62, an accumulator 64, a direct line DL which has an argument evaluator 66, and a digital adder 68. Both the direct line DL and the correction branch CB receive each complex digital signal value $Y_X(k)$ produces at the appropriate outputs of the polarization tracker 52 of the DSP of FIG. 3.

On the direct line DL, the argument evaluator 66 determines the phase angle of each received complex digital signal value $Y_X(k)$ and outputs said phase angle to the plus input of the digital adder 68.

On the correction branch CB, the frequency offset estimator 62 determines an incremental phase angle offset (i.e., $\Delta\phi_k$) that the received complex digital signal value $Y_X(k)$ has over the last received complex digital signal value $Y_X(k-1)$. Here, the incremental phase angle offset $\Delta\phi_k$ is due to the frequency offset [$\omega_{MC}-\omega_{RC}$] between the local optical oscillator 18 and the modulated optical carrier that is received from the optical communications channel 14.

On the correction branch CB, the accumulator 64 adds the determined incremental phase offset $\Delta\phi_k$ for the sampling period "k" to the sum of earlier such determined phase angle offsets $$\left(\text{i.e., } \sum_{r}^{k-1} \Delta\phi_r\right)$$

to produce a cumulative phase angle offset. Then, the cumulative phase angle offset $$\left(\text{i.e., } \sum_{r}^{k} \Delta\phi_r\right)$$

(i.e., $\Sigma_r^k \Delta\phi_r$) due to the frequency offset is delivered to the minus input of the digital adder 68.

The digital adder 68 subtracts the cumulative phase angle offset, which was caused by the frequency offset, from the phase argument angle of the present received complex digital signal value $Y_X(k)$ to produce the frequency-offset compensated phase argument angle $\Theta_X(k)$.

Figure 5:
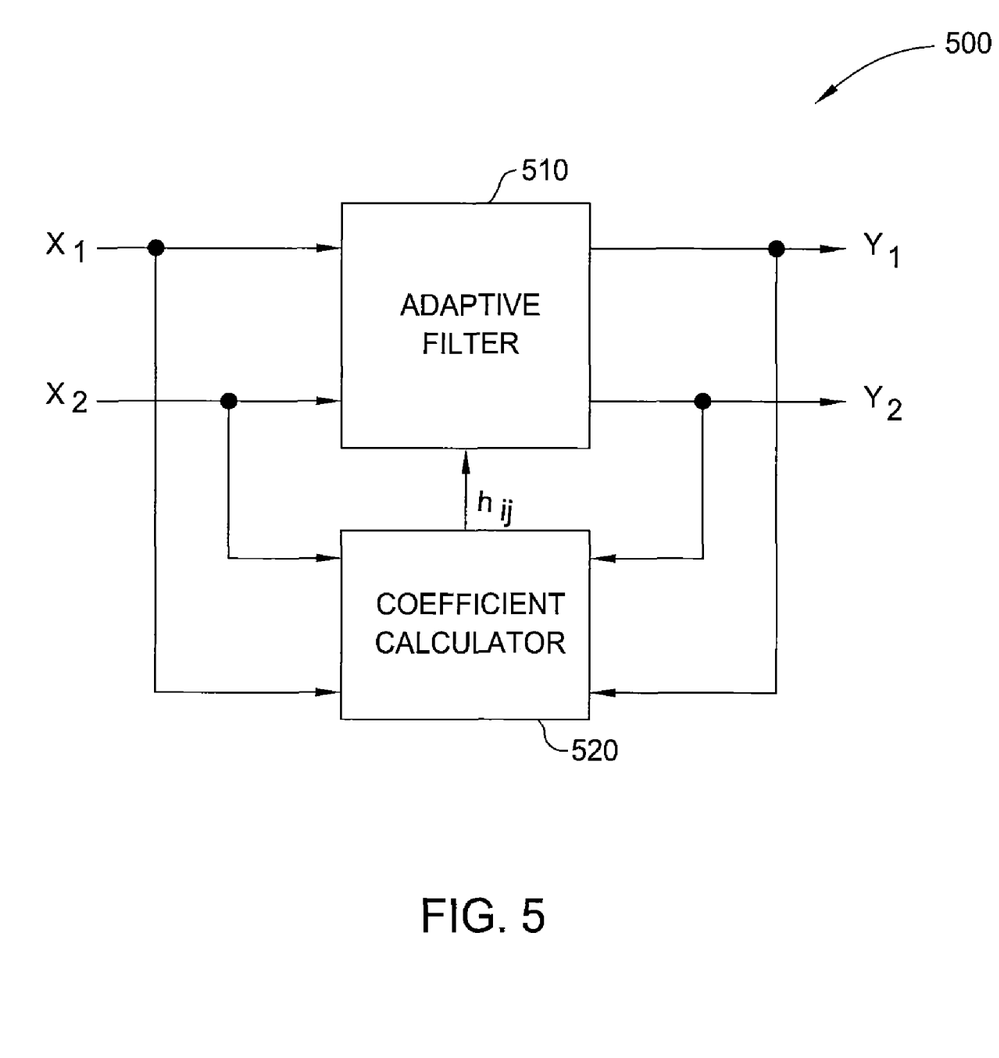
FIG. 5 depicts a high level block diagram of a constant modulus algorithm (CMA) adaptive FIR filter suitable for use in the DSP of FIG. 3.

FIG. 5 depicts a high level block diagram of a constant modulus algorithm (CMA) adaptive FIR filter suitable for use in the DSP of FIG. 3. As previously noted, the polarization tracker 52' of the DSP 24 includes three CMA adaptive FIR filters, such as the one CMA adaptive FIR filter depicted in FIG. 5.

For purposes of simplifying the discussion, it is assumed that the input signals processed by each of the three CMA adaptive FIR filters 500 used in polarization tracker 52' are approximately 2-fold oversampled (i.e., the ADC samples the signals about twice per symbol) and that data is coded independently in both optical polarization orientations. As such a signal propagates down a fiber, the polarization state gets altered. Thus, at the receiver site, both signals are convoluted. The CMA algorithm is utilized to deconvolute the signals. Part of the invention rests in the inventors observation that the CMA can also be utilized for interpolation and timing recovery. In this case, the CMA operates in an adaptive downsampling mode.

The CMA adaptive FIR filter 500 of FIG. 5 comprises adaptive filter 510 and coefficient calculator 520. The coefficient calculator 520 adapts coefficients of the adaptive filter 510 based on an error signal which is dependent on the deviation of the output amplitude from a desired amplitude. Optionally, the CMA adaptive filter is used as interpolation filter to save valuable signal processing resources.

Referring to the arrangement of FIG. 5, $x_i(k \, Ts)$ represents the sampled complex data of both received polarization orientations sampled at a rate $T_S$, and $y_i(k \, T_t)$ represents the recovered data samples for both transmit polarizations, sampled at a rate $T_t$. In general, $T_S=2T_t+T_e$, where $T_e$ represents the timing error between sample rate and symbol rate caused by frequency error from the oscillator controlling the sample process, from random timing jitter and from phase error. The complex filter coefficients are $h_{ij}(m)$. Thus, the output $y_i(k \, T_t)$ of adaptive filter 510 is calculated according to the following equation:

$$\begin{pmatrix} y_1(kT_t) \\ y_2(kT_t) \end{pmatrix} = \sum_m \begin{pmatrix} h_{11}(m) & h_{12}(m) \\ h_{21}(m) & h_{22}(m) \end{pmatrix} \begin{pmatrix} x_1(2kT_t+m) \\ x_2(2kT_t+m) \end{pmatrix} \quad \text{(eq. 2)}$$

The filter coefficients are updated according to the following equation:

$$h_{ij}(m) = h_{ij}(m) - \mu \partial e_i y_i(kT_t) x_j^*(2k \, T_t + m) \quad \text{(eq. 3)}$$

with $$\partial e_i = |y_i|^2 - 1 \quad \text{(eq. 4)}$$

In the above equations 2-4, it is assumed that $T_e=0$. The case of $T_e \neq 0$ will now be discussed in more detail.

Timing variations can be monitored by calculating the group delay of the filter coefficients according to the following equation:

$$\tau_{ij} = \text{real}\left(\frac{\sum_m m h_{ij}(m)}{\sum_m h_{ij}(m)}\right) \quad \text{(eq. 5)}$$

The group delay of the filter coefficients should be about half of the filter length (i.e., for a filter having a tap length of l, m=0 . . . l−1, τ should be around l/2). If $T_e \neq 0$, the filter coefficients will be adapted so that τ might significantly drift away from the desired value l/2. The time derivative of τ is proportional to the frequency offset of the sampling clock with respect to the symbol clock and can be used as an error signal in a mixed-mode implementation.

Triple CMA Adaptive FIR Filter

To enable the tracking of the symbol rate over a larger range of $T_e$, one embodiment utilizes a polarization tracker 52' within the DSP 24 that includes three CMA adaptive FIR filters operating in parallel and according to three respective coefficient update routines such as provided in equation 3. However, the filter coefficients from only one of the three CMA adaptive FIR filters are selected for further processing.

Specifically, the coefficients for each of the three CMA adaptive FIR filters are initialized in a manner causing the normalized (to the sampling periods) group delay of the filters to differ by approximately one count. One count is defined as the amount of time approximating an A/D sampling period. As an initial condition, in one embodiment the coefficients associated with the filters cause the first, second and third filters to exhibit group delays of, respectively, l/2−1, l/2 and l/2+1. Only the result of the second filter is used for further processing.

If the group delay of filter 2 becomes larger than l/2+1 (i.e., the second filter exhibited group delay exceeds the initial value of the third filter exhibited group delay), then the filter coefficients are exchanged according to the following rules:

(1) Filter1<=filter2;
(2) Filter2<=filter3; and
(3) Filter3<=shift(filter2,−1).

in addition, a counter variable c is incremented by 1.

The operation "shift" denotes a shift of the coefficients by one to the left, such as for example h(m)<=h(m+1).

To accommodate the above-described coefficient shift (shown in rule 3), the calculation (equation 2) representing the output $y_i(k \, T_t)$ of adaptive filter 510 is adapted to that of equation 6, and the calculation (equation 3) for updating filter coefficients is adapted to that of equation 7, as follows:

$$\begin{pmatrix} y_{1,l}(kT_t) \\ y_{2,l}(kT_t) \end{pmatrix} = \sum_m \begin{pmatrix} h_{11,l}(m) & h_{12,l}(m) \\ h_{21,l}(m) & h_{22,l}(m) \end{pmatrix} \begin{pmatrix} x_1(2kT_t + m + c + l) \\ x_2(2kT_t + m + c + l) \end{pmatrix} \quad \text{(eq. 6)}$$

$$h_{ij,l}(m) = z^{-1} h_{ij,l}(m) - \mu \partial e_i y_i(kT_t) x_j^*(2kT_t + m + c + l) \quad \text{(eq. 7)}$$

where l denotes the filter number (i.e., l=1, 2 or 3). In a circuit, the functionality of the counter variable c in equation 6 is implemented using, illustratively, a multiplexer.

If the group delay of filter 2 becomes smaller than l/2−1 (i.e., the first filter exhibited group delay exceeds the initial value of the second filter exhibited group delay), then the filter coefficients are exchanged according to the following rules:
(1) Filter1<=shift(filter2,1);
(2) Filter2<=filter1; and
(3) Filter3<=filter2.

In addition, the counter variable c is decremented by 1.

If the counter variable c becomes equal to +/−2, a cycle slip has occurred and is corrected for in the following manner: First, counter variable c is reset to 0. If c was previously −2, an additional output symbol according to equation 6 (with updated c) is inserted into the output stream. If c was previously 2, then the last output symbol is removed from the output stream. Inserting and deleting symbols from the output stream is equivalent to a rate change and is implemented in a circuit using, illustratively, a rate-change FIFO buffer.

Figure 6:
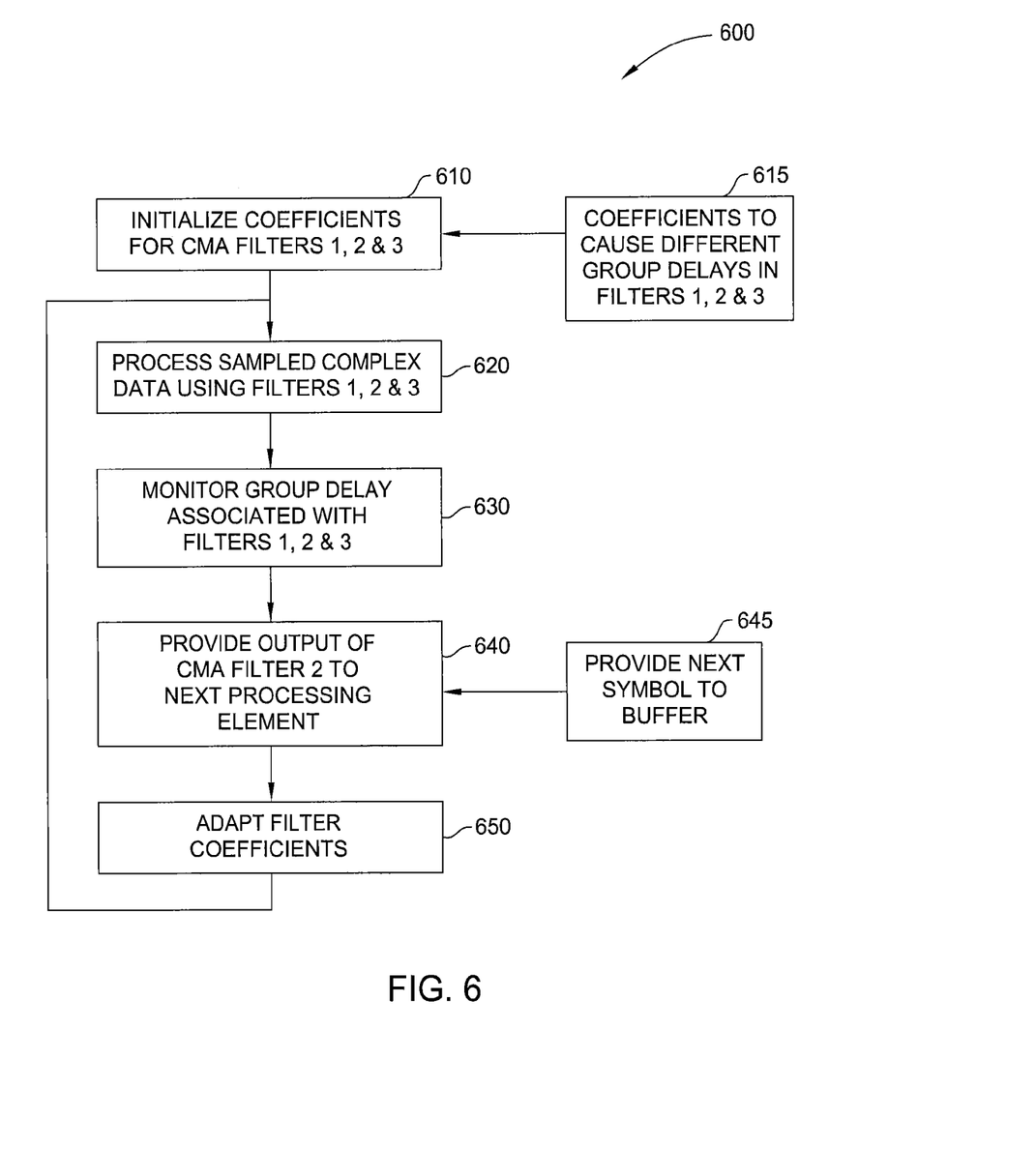
FIG. 6 depicts a flow diagram of a method for processing sampled complex data suitable for use in the suitable for use in the DSP of FIG. 3.

FIG. 6 depicts a flow diagram of a method for processing sampled complex data suitable for use in the suitable for use in the DSP of FIG. 3. Specifically, the method 600 of FIG. 6 substantially recites the methodology discussed above with respect to the various filters.

The method 600 is entered at step 610 where the coefficients for the first, second and third CMA filters are initialized. Referring to box 615, the coefficients are established in such a manner as to cause the first, second and third filters to exhibit respective first, second and third group delays. The first group delay is selected as one count less than half the filter tap length. The second group delay is selected as half the filter tap length. The third group delay is selected as one count more than half the filter tap length. Other group delay selections may be used to cause the filters to exhibit the first (relatively short), third (relatively long) and second (middle) group delays.

At step 620, the sampled complex data is processed using each of the three filters. At step 630, the group delay is associated with the three filters is monitored. It will be appreciated by those skilled in the art that the step of monitoring the filter group delay is may be performed contemporaneously with other steps described herein.

At step 640, the output of the second CMA filter is provided to the next processing element. Referring to box 645, step 640 may comprise, illustratively, providing a next symbol to a buffer or other processing element. At step 650, the filter coefficients associated with the three filters are adapted as appropriate. Specifically, the coefficients of the three filters are adapted in accordance with changes in the group delay exhibited by the second filter, as provided in the methodology discussed herein with respect to the various filters.

Figure 7:
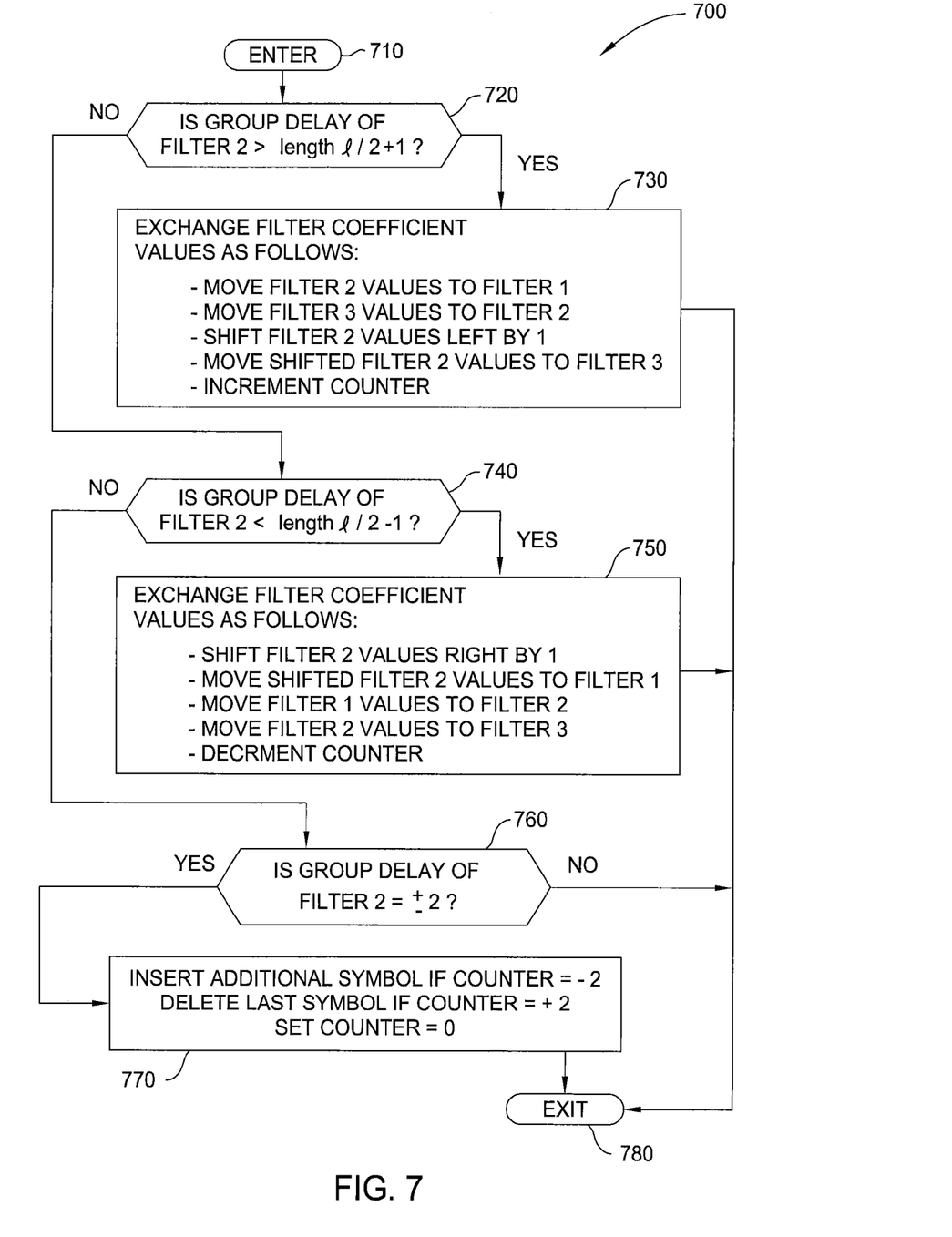
FIG. 7 depicts a flow diagram of a method for adapting filter coefficients suitable for use in the DSP of FIG. 3.

FIG. 7 depicts a flow diagram of a method for adapting filter coefficients suitable for use in the DSP of FIG. 3. Specifically, the method 700 of FIG. 7 provides a filter coefficients adapting methodology suitable for use in implementing step 650 of the method 600 of FIG. 6. The method 700 is entered at step 710 and proceeds to step 720.

At step 720, a determination is made as to whether the group delay exhibited by the second filter is greater than a first threshold amount (illustratively one sample period, though other threshold amounts to be selected), then at step 730 the various filter coefficients are exchanged according to the following rules (as discussed above): namely, (1) Filter1<=filter2; (2) Filter2<=filter3; and (3) Filter3<=shift (filter2,−1). In addition, the counter variable c is incremented by 1. The method 700 is then exited.

At step 740, a determination is made as to whether the group delay exhibited by the second filter is less than a first threshold amount (illustratively one sample period, though other threshold amounts may be selected). If so, then at step 750 the various filter coefficients are exchanged according to the following rules (as discussed above): namely, (1) Filter1<=shift(filter2,1); (2) Filter2<=filter1; and (3) Filter3<=filter2. In addition, the counter variable c is decremented by 1. The method 700 is then exited.

At step 760, a determination is made as to whether the group delay exhibited by the second filter is greater than or less than a second threshold amount (illustratively two sample periods, though other threshold amounts may be selected). If the group delay exhibited by the second filter is greater than the second threshold amount, then at step 770 the previous symbol to be provided for further processing in the output symbol sequence/stream is deleted. If the group delay exhibited by the second filter is less than the second threshold amount, then at step 770 an additional symbol is inserted into the output symbol sequence/stream. The method is then exited.

An apparatus according to one embodiment for use in an optical receiver comprises a digital signal processor (DSP) implemented in a general purpose computer or a special purpose computer. In various embodiments, such a DSP includes or cooperates with one or more processors, various support circuitry, input-output (I/O) circuitry, memory, communication buses and so on for receiving, processing, providing and/or exchanging information.

The at least one processor may be any conventional processor for executing programs stored in memory. The memory may be any conventional volatile memory (e.g., RAM, DRAM, among others), non-volatile memory (e.g., disk drives, floppy, drives, CDROM, EPROMS, among other computer readable medium) or any other conventional memory device for storing data and various control programs, such as methodology according to the present invention.

The processor cooperates with conventional support circuitry, such as power supplies, clock circuits, cache memory and the like, as well as circuits that assist in executing the various programs and routines, as well as other programs and data. As such, it is contemplated that some of the process steps discussed herein as software processes may be implemented within hardware, for example, as circuitry that cooperates with the processor to perform various steps. The input/output (I/O) circuitry forms an interface between the various functional elements communicating with each network element.

Although the DSP described herein is depicted as a general-purpose computer that is programmed to perform various control functions in accordance with the present embodiments, various embodiments may be implemented in hardware such as, for example, an application specific integrated circuit (ASIC) or a field-programmable gate array (FPGA). As such, it is intended that the processes described herein be broadly interpreted as being equivalently performed by software, hardware, or a combination thereof.

The invention may be implemented as a computer program product wherein computer instructions, when processed by a computer, adapt the operation of the computer such that the methods and/or techniques of the present invention are invoked or otherwise provided. Instructions for invoking the inventive methods may be stored in fixed or removable media, transmitted via a data stream in a signal bearing medium such as a broadcast medium, and/or stored within a working memory within a computing device operating according to the instructions.

While the foregoing is directed to various embodiments of the present invention, other and further embodiments of the invention may be devised without departing from the basic scope thereof. As such, the appropriate scope of the invention is to be determined according to the claims, which follow.

What is claimed is:

1. Apparatus, comprising:
a digital signal processor (DSP) adapted to receive a sequence of complex sampled values associated with a modulated optical carrier and responsively provide a corresponding sequence of symbols;
the DSP is configured to include three constant modulus algorithm (CMA) adaptive finite impulse response (FIR) filters, each filter processing the received sequence of complex sampled values according to a respective set of filter coefficients to provide thereby a respective sequence of symbols, a first filter exhibiting a first group delay, a second filter exhibiting a second group delay and a third filter exhibiting a third group delay, the first group delay initially being less than the second group delay, the second group delay initially being less than the third group delay;
the DSP is configured to include a mechanism for adapting the filter coefficients sets to constrain the exhibited group delays;
the DSP selecting for further processing the sequence of symbols provided by the second filter.

2. The apparatus of claim 1, wherein:
the mechanism for adapting the filter coefficients selectively changes filter coefficients in response to changes in exhibited group delay.

3. The apparatus of claim 2, wherein:
in response to the exhibited group delay of the second filter increasing by more than a threshold amount, the mechanism for adapting the filter coefficients operates to reassign filter coefficient sets as follows:
the coefficient set associated with the second filter is reassigned to the first filter;
the coefficient set associated with the second filter is shifted left by one coefficient and reassigned to the first filter; and
the coefficient set associated with the third filter is reassigned to the second filter.

4. The apparatus of claim 2, wherein:
in response to the exhibited group delay of the second filter decreasing by more than a threshold amount, the mechanism for adapting the filter coefficients operates to reassign filter coefficient sets as follows:
the coefficient set associated with the second filter is reassigned to the third filter;
the coefficient set associated with the second filter is shifted right by one coefficient and reassigned to the first filter; and
the coefficient set associated with the first filter is reassigned to the second filter.

5. The apparatus of claim 2, wherein:
in response to the exhibited group delay of the second filter increasing by more than a second threshold amount, the DSP operates to remove the last symbol from the provided sequence of symbols.

6. The apparatus of claim 2, wherein:
in response to the exhibited group delay of the second filter decreasing by more than a second threshold amount, the DSP operates to add a symbol to the provided sequence of symbols.

7. The apparatus of claim 3, wherein the threshold amount comprises approximately one sample period.

8. The apparatus of claim 5, wherein the second threshold amount comprises approximately two sample periods.

9. The apparatus of claim 1, further comprising:
an optical hybrid configured to mix the received optical carrier signal with a reference optical carrier signal to provide thereby two mixed optical signals, the mixed optical signal having different phase; and
a pair of light detectors, each light detector configured to generate a sequence of complex sampled values in response to a respective one of the mixed optical signals.

10. The apparatus of claim 9, wherein the DSP is further configured to include at least one of a frequency offset correction mechanism, a phase offset correction mechanism and a symbol estimation mechanism for processing the sequence of symbols selected for further processing.

11. The apparatus of claim 9, wherein the pair of light detectors comprise single ended light detectors.

12. The apparatus of claim 9, further comprising a pair of optical splitters for passing respective portions of the modulated optical carrier and a local oscillator optical signal to the pair of light detectors.

13. The apparatus of claim 1, wherein the filter group delays are calculated according to the following equation:

$$\tau_{ij} = \text{real}\left(\frac{\sum_m m h_{ij}(m)}{\sum_m h_{ij}(m)}\right).$$

14. The apparatus of claim 1, wherein an output yi(k Ti) of each filter is adapted to the following equation:

$$\begin{pmatrix} y_{1,l}(kT_t) \\ y_{2,l}(kT_t) \end{pmatrix} = \sum_m \begin{pmatrix} h_{11,l}(m) & h_{12,l}(m) \\ h_{21,l}(m) & h_{22,l}(m) \end{pmatrix} \begin{pmatrix} x_1(2kT_t + m + c + l) \\ x_2(2kT_t + m + c + l) \end{pmatrix}.$$

15. The apparatus of claim 1, wherein the coefficients of each filter are adapted to the following equation:

$$h_{ij,l}(m) = z^{-1} h_{11,l}(m) - \mu \partial e_i y_i(kT_t) x_j^*(2kT_t + m + c + l).$$

16. A method, comprising:
processing a sequence of complex sampled values associated with a modulated optical carrier according to each of three constant modulus algorithm (CMA) adaptive finite impulse response (FIR) filters, each filter processing the received sequence of complex sampled values according to a respective set of filter coefficients to provide thereby a respective sequence of symbols, a first filter exhibiting a first group delay, a second filter exhibiting a second group delay and a third filter exhibiting a third delay, the first group delay initially being less than the second group delay, the second group delay initially being less than the third group delay;
adapting the filter coefficients sets to constrain the exhibited group delays; and selecting for further processing the sequence of symbols provided by the second filter.

17. A non-transitory computer-readable storage medium storing computer instructions which, when processed by a computer, adapt the operation of the computer to perform a method, the method comprising:

processing a sequence of complex sampled values associated with a modulated optical carrier according to each of three constant modulus algorithm (CMA) adaptive finite impulse response (FIR) filters, each filter processing the received sequence of complex sampled values according to a respective set of filter coefficients to provide thereby a respective sequence of symbols, a first filter exhibiting a first group delay, a second filter exhibiting a second group delay and a third filter exhibiting a third delay, the first group delay initially being less than the second group delay, the second group delay initially being less than the third group delay;

adapting the filter coefficients sets to constrain the exhibited group delays; and selecting for further processing the sequence of symbols provided by the second filter.

* * * * *